Aug. 15, 1939.   J. B. WHITTED   2,169,827
ELECTRIC FUEL PUMP
Filed March 6, 1936   12 Sheets-Sheet 1

Inventor.
John B. Whitted
By Williams, Bradbury, McCaleb & Hinkle
Attys.

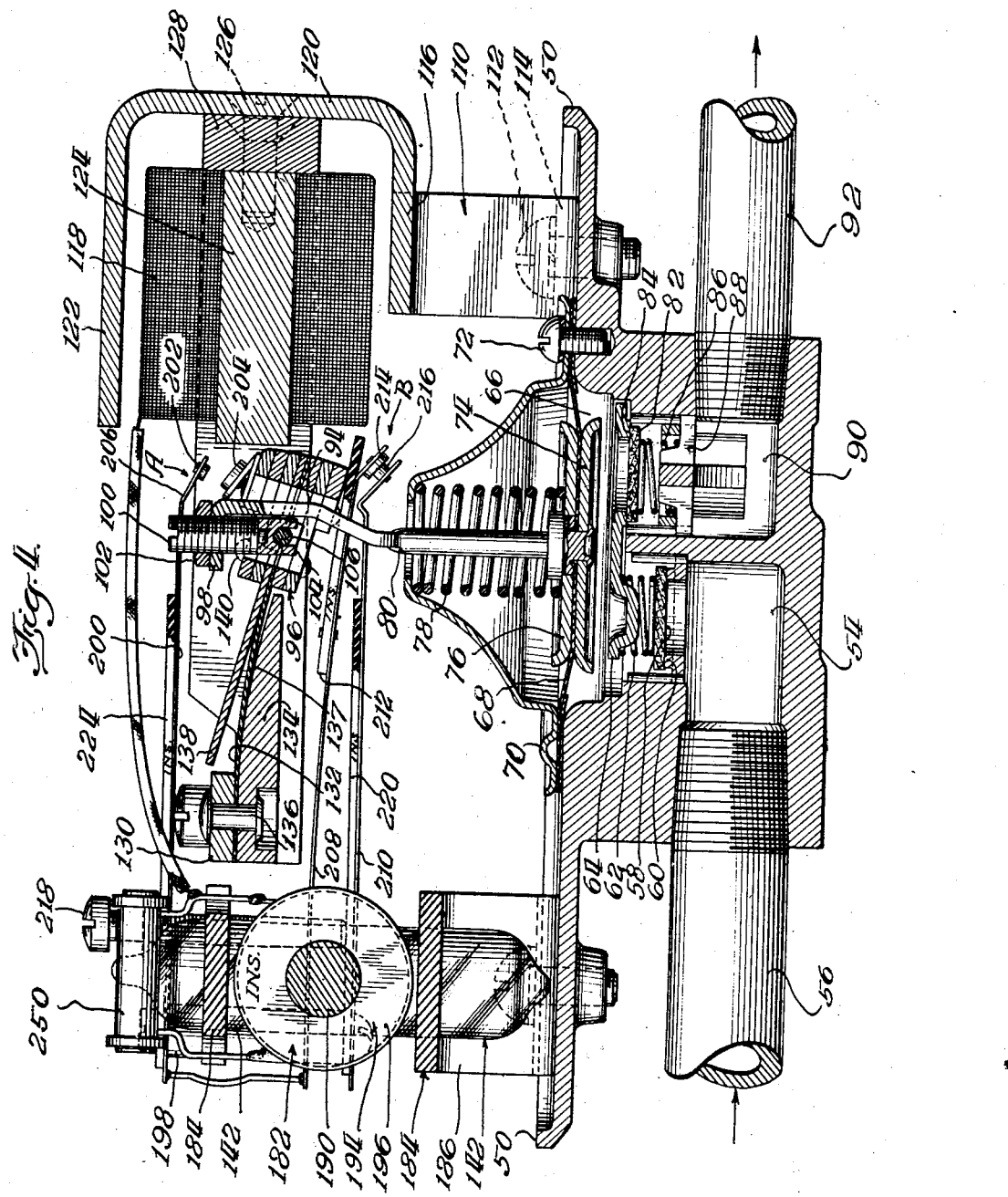

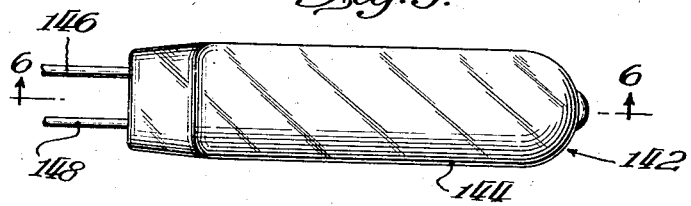
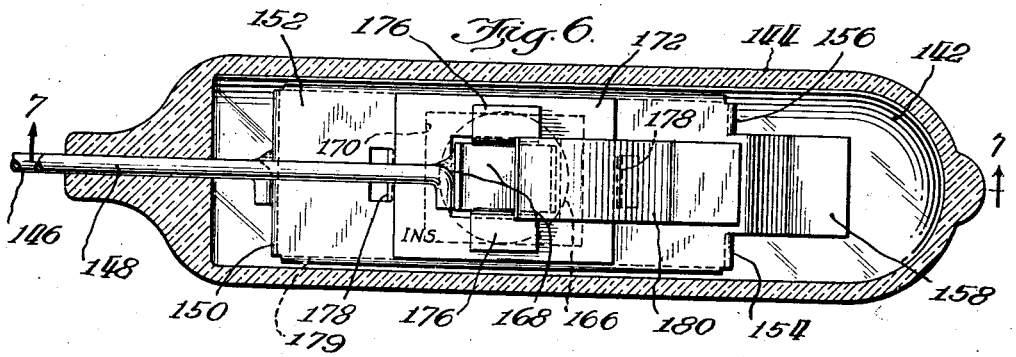
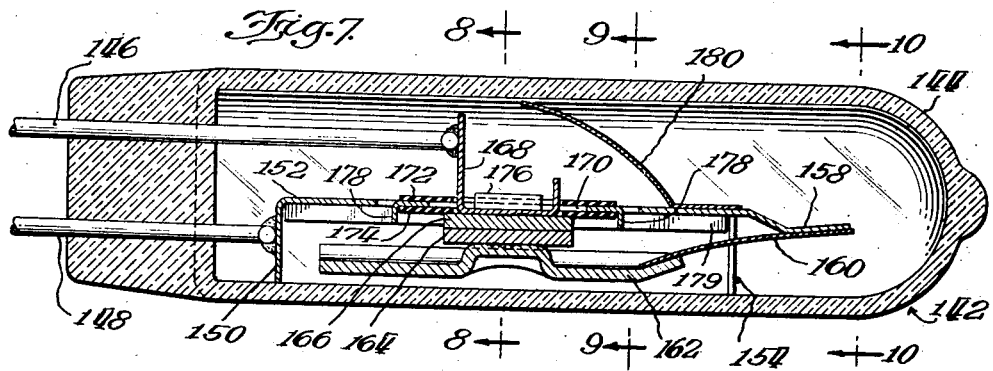
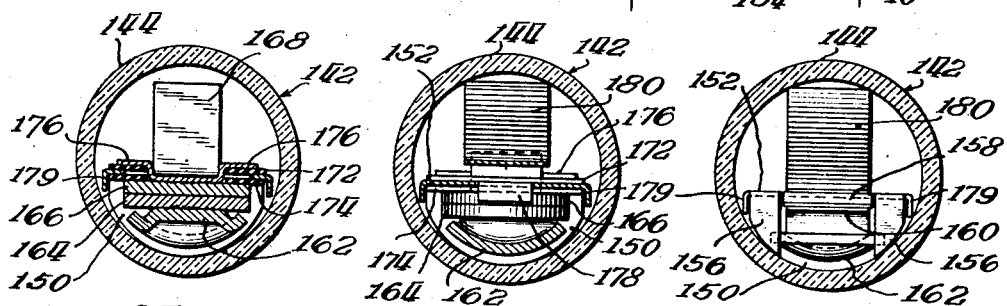

Aug. 15, 1939    J. B. WHITTED    2,169,827
ELECTRIC FUEL PUMP
Filed March 6, 1936    12 Sheets-Sheet 4
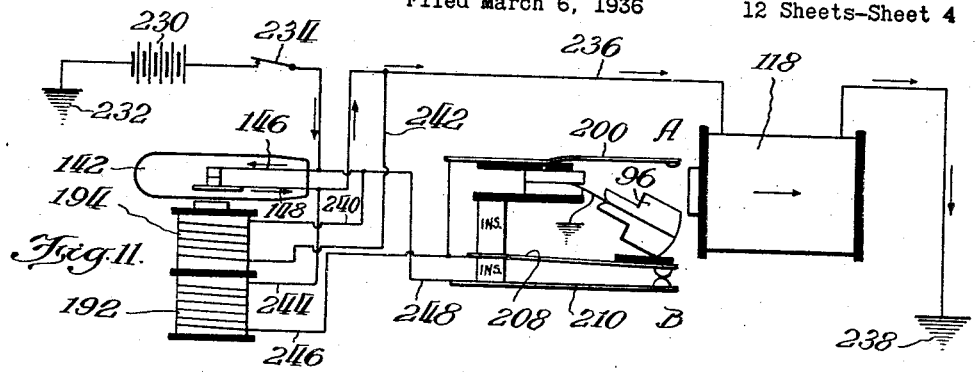
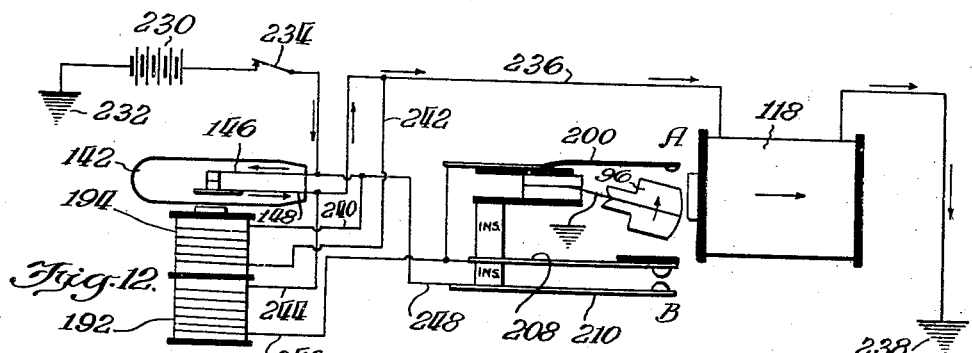
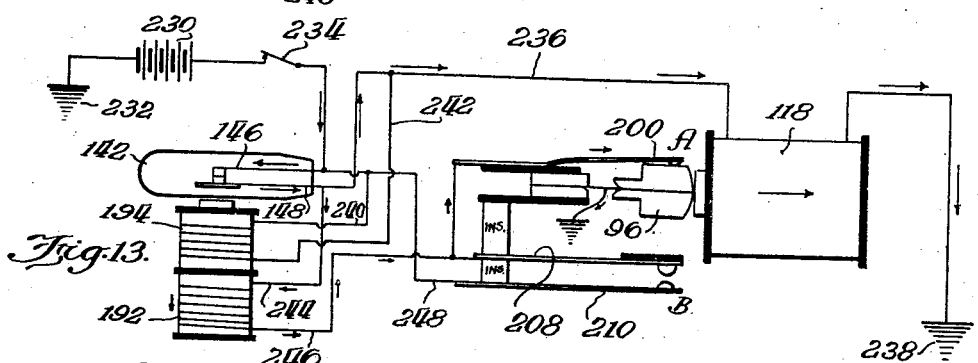
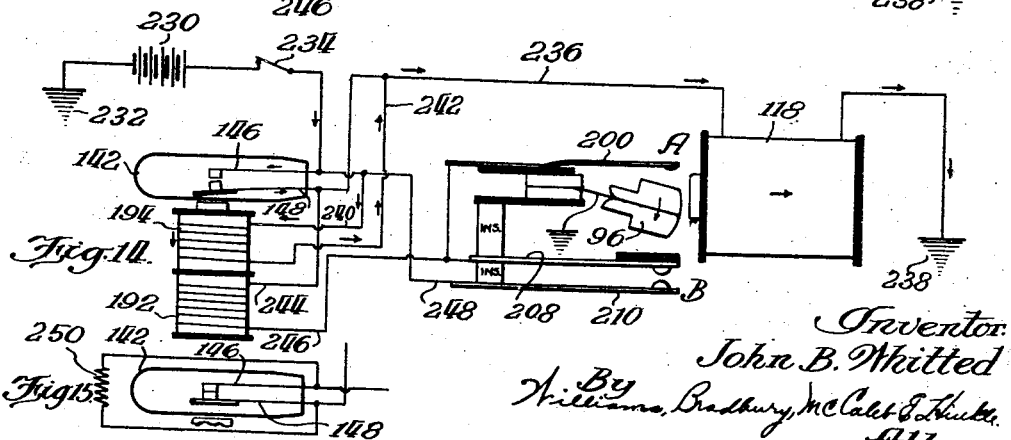
Inventor:
John B. Whitted
By Williams, Bradbury, McCaleb & Hinkle
Attys.

Aug. 15, 1939  J. B. WHITTED  2,169,827
ELECTRIC FUEL PUMP
Filed March 6, 1936  12 Sheets-Sheet 5

Inventor.
John B. Whitted
By Williams, Bradbury,
McCabe & Hinkle.
Attys.

Aug. 15, 1939.  J. B. WHITTED  2,169,827
ELECTRIC FUEL PUMP
Filed March 6, 1936  12 Sheets-Sheet 6

Inventor
John B. Whitted
By Williams, Bradbury, McCaleb & Hinkle
Attys.

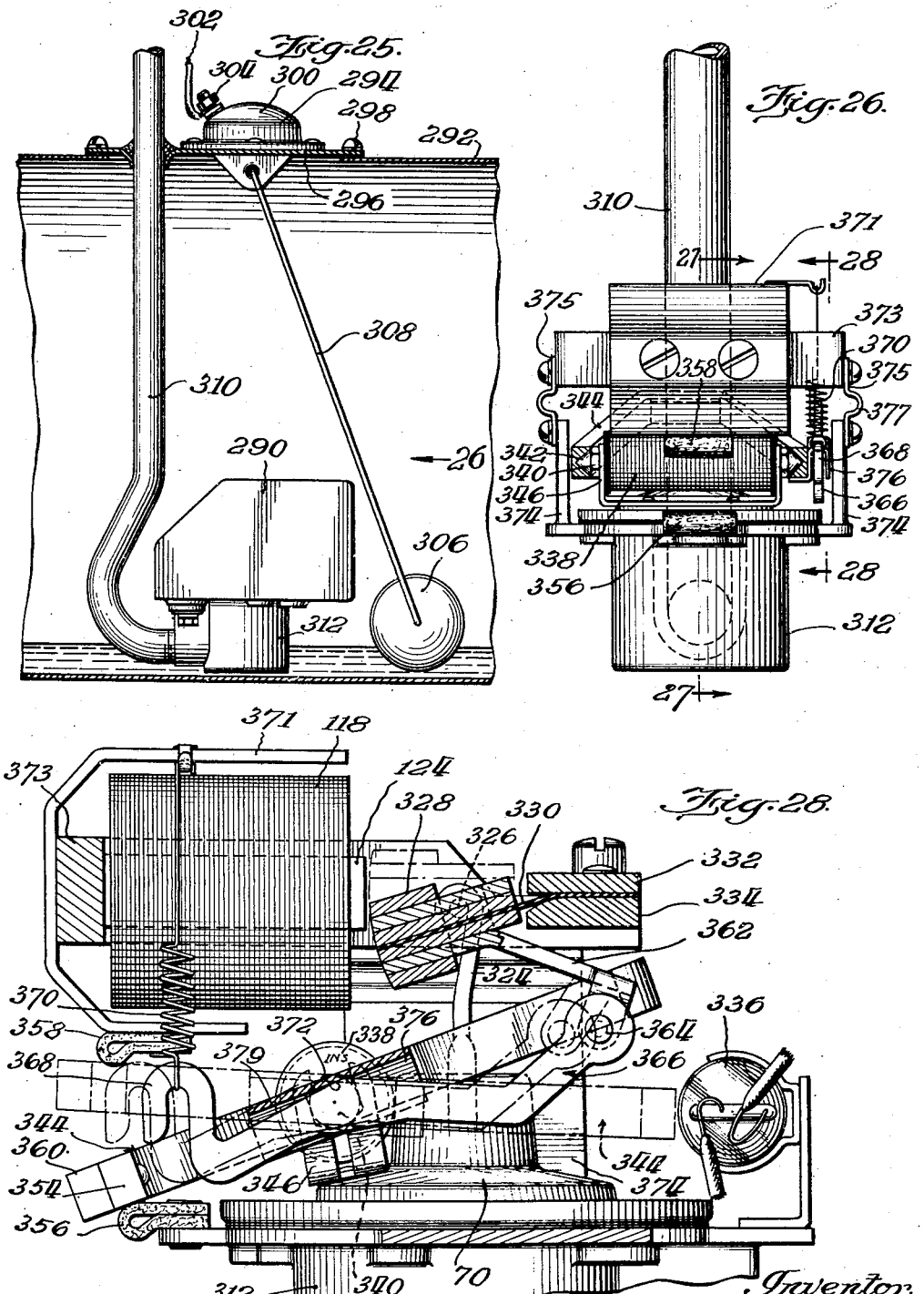

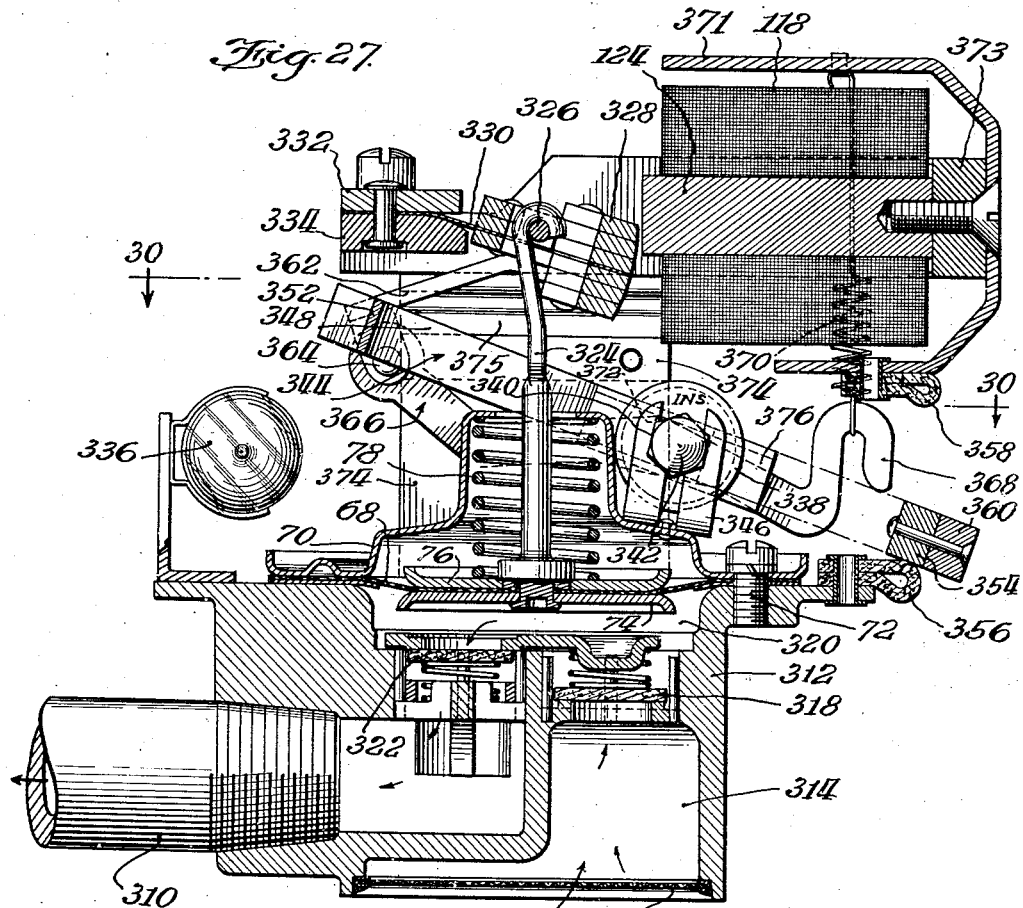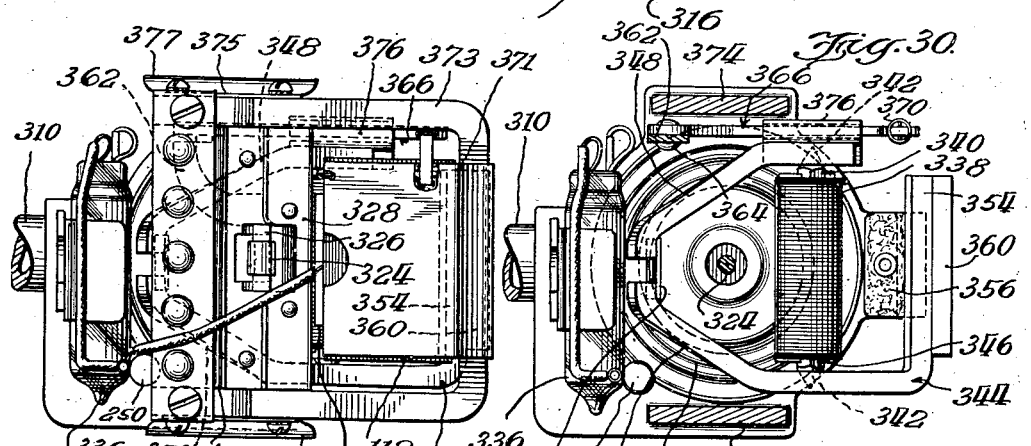

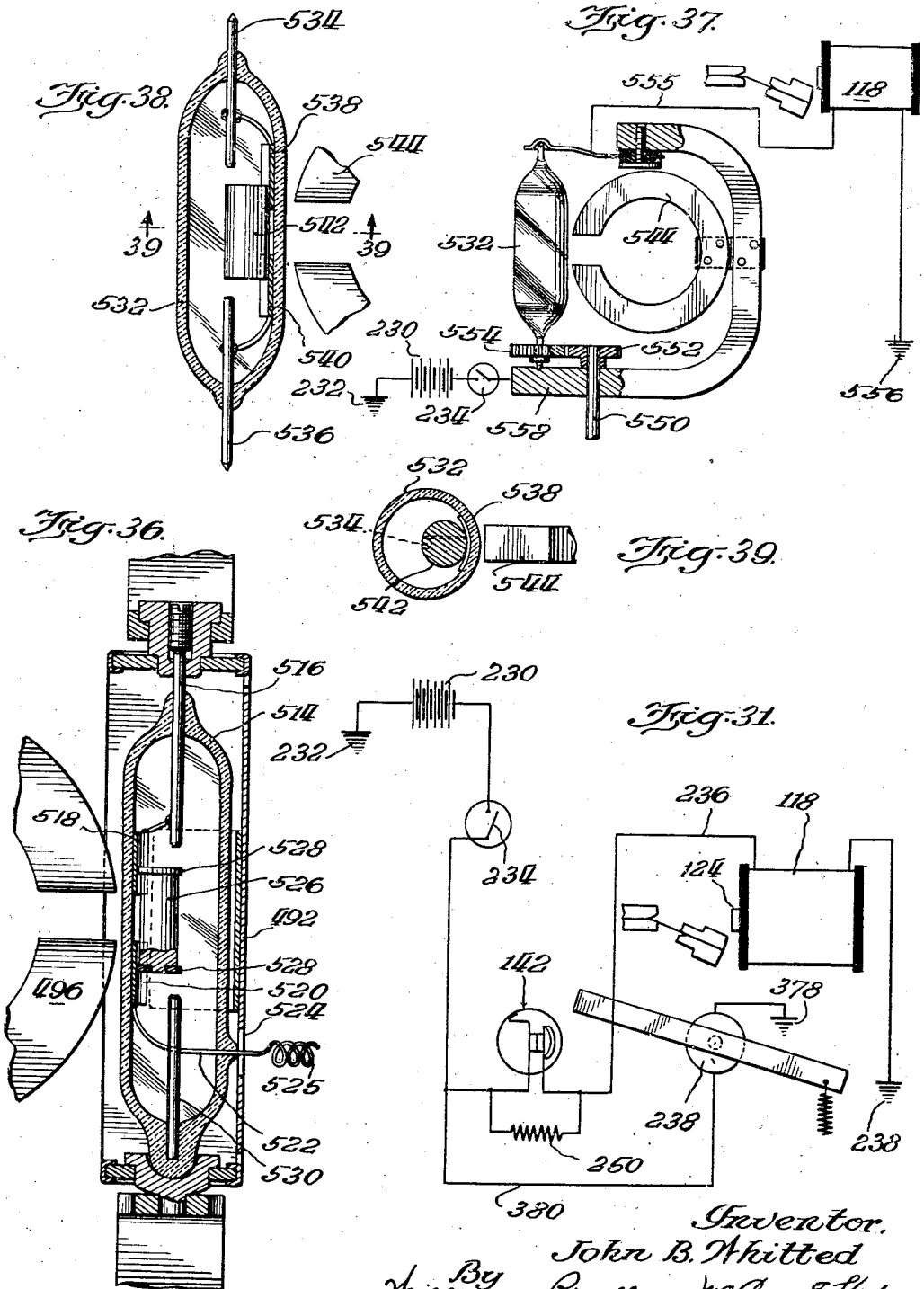

Inventor
John B. Whitted
By Williams, Bradbury, McCaleb & Hinkle
Attys.

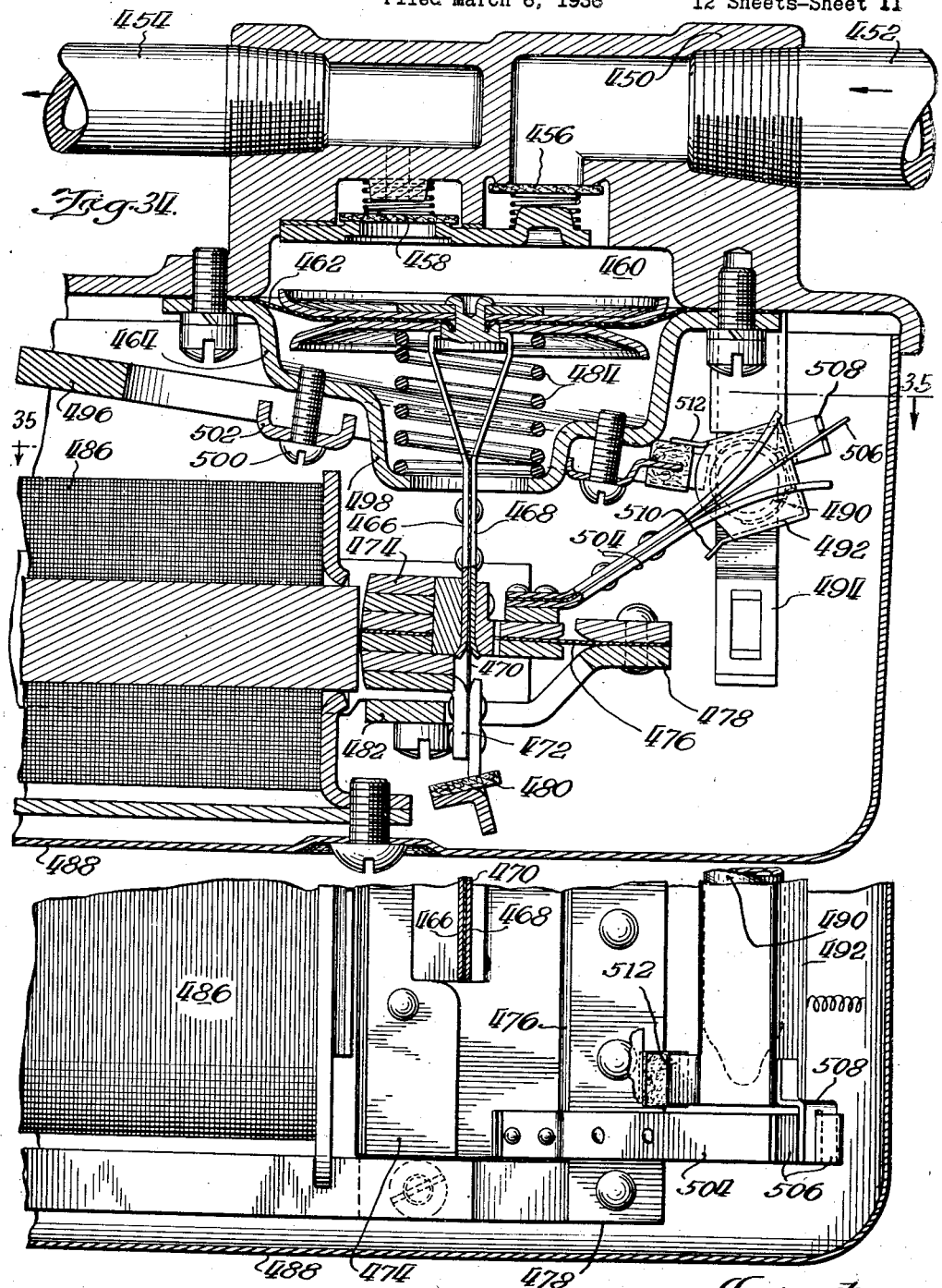

Aug. 15, 1939  J. B. WHITTED  2,169,827
ELECTRIC FUEL PUMP
Filed March 6, 1936  12 Sheets-Sheet 12

Inventor.
John B. Whitted
By Williams, Bradbury, McCaleb & Hinkle.
Attys.

Patented Aug. 15, 1939

2,169,827

UNITED STATES PATENT OFFICE 2,169,827

ELECTRIC FUEL PUMP

John B. Whitted, Glencoe, Ill., assignor to Stewart-Warner Corporation, Chicago, Ill., a corporation of Virginia Application March 6, 1936, Serial No. 67,527

42 Claims. (Cl. 103—150)

My invention pertains to electric fuel pumps and more particularly to electric fuel pumps for automobiles and other vehicles.

An object of my invention is to provide an improved electric fuel pump which is simple in construction, reliable in operation, and economical to manufacture.

Another object is to provide an improved electric fuel pump which will operate satisfactorily for all variations in voltage of the automobile battery.

Another object is to provide an improved electric fuel pump which is quiet in operation and which draws so little current that it does not constitute a drain on the automobile battery.

Another object is to provide an electric fuel pump which may be located at any point on the automobile and which will withstand the jars and vibration to which it is subjected.

Another object is to provide an improved electric fuel pump which may be completely inclosed either for the purpose of locating it in a body of liquid or to prevent it from interfering with an automobile radio.

Another object is to provide an electrical fuel pump in which arcing at the contact points of the switches is either prevented entirely or reduced to a minimum.

Other objects and advantages will become apparent as the description proceeds.

In the drawings,

Figure 4 is an enlarged vertical section taken on the line 4—4 of Figure 1;

Figure 5 is an elevational view of a desirable form of switch mechanism;

Figure 6 is a longitudinal section of the switch shown in Figure 5;

Figure 7 is a further longitudinal section of the switch shown in Figure 5, being taken in a plane at right angles to the plane of Figure 6;

Figure 20:
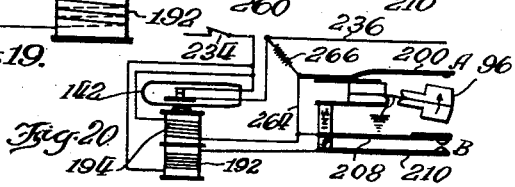
Figure 32:
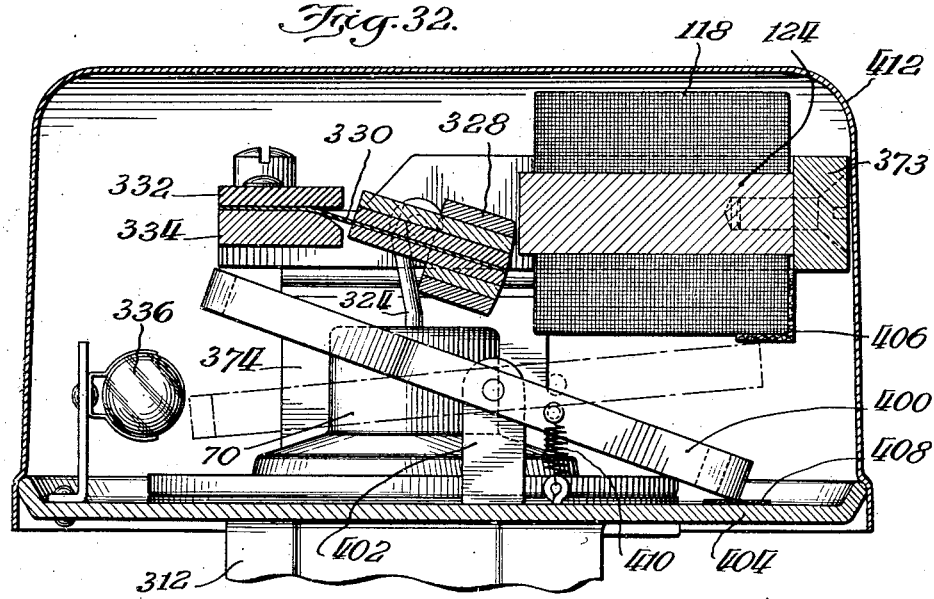
Figure 33:
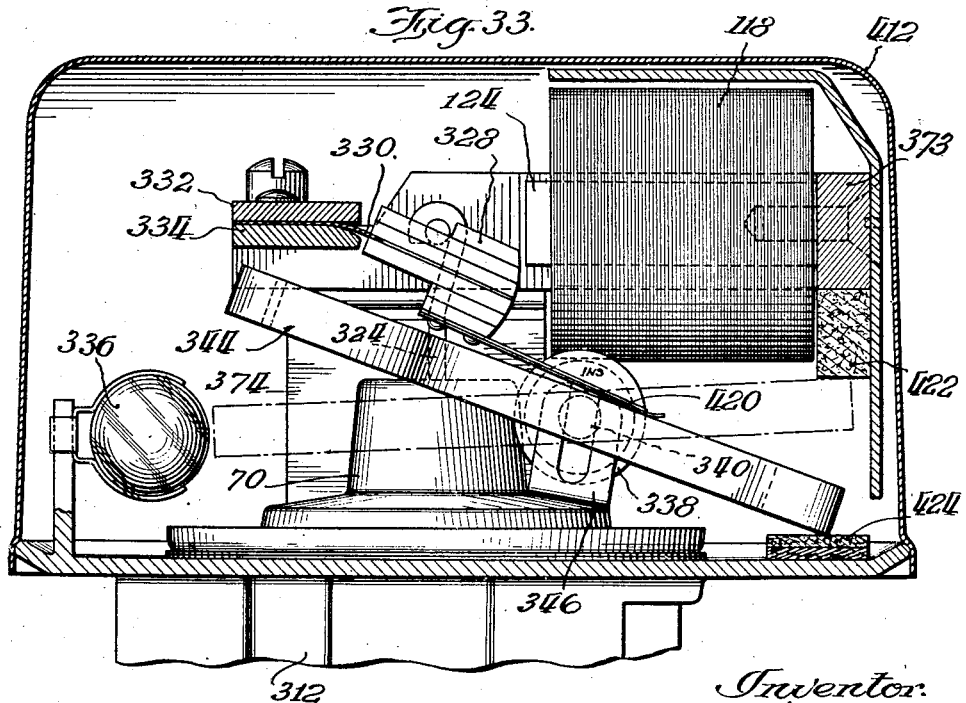
Figure 110:
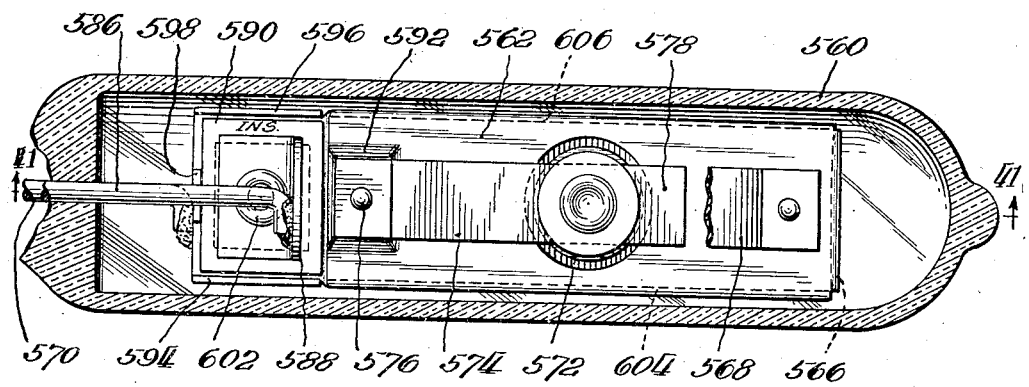
Figure 111:
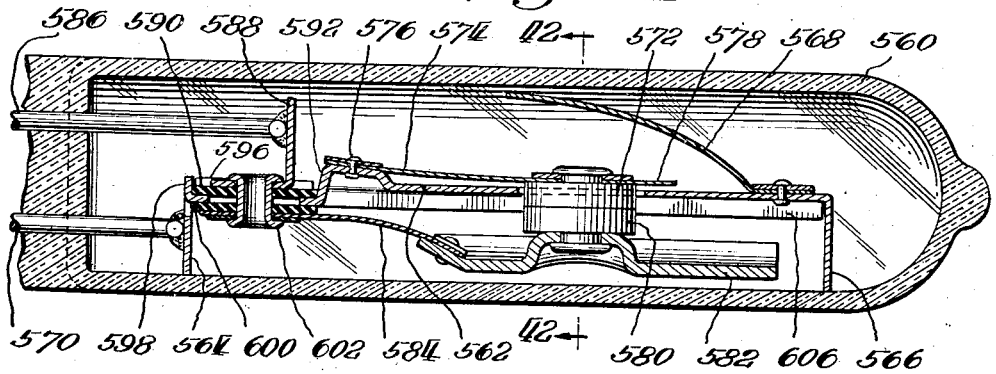
Figure 112:
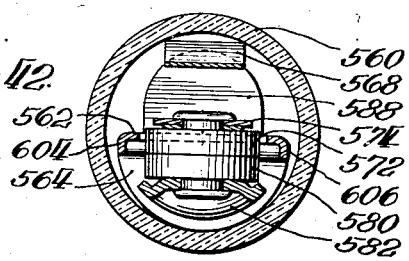

Figures 8, 9 and 10 are transverse sections of Figure 7, being taken, respectively, on lines 8—8, 9—9 and 10—10;

Figures 11, 12, 13 and 14 are diagrammatic views showing a preferred form of electrical connections, these figures showing the parts in different positions and indicating the directions of current flow corresponding to the several positions of the parts;

Figure 15 is a fragmentary diagrammatic view showing a high resistance located across the main switch;

Figures 16, 17, 18 and 19 are diagrammatic views of a different wiring arrangement and correspond generally to Figures 11, 12, 13 and 14;

Figure 20 is a diagrammatic view of a modification of the wiring arrangement shown in Figures 16 to 19, inclusive;

Figures 21, 22, 23 and 24 are diagrammatic views of still another wiring arrangement and are generally similar to Figures 11, 12, 13 and 14;

Figure 25 shows a modified form of fuel pump constructed and arranged for mounting in the main fuel tank of an automobile;

Figure 26 is a view looking in the direction of the arrow 26 of Figure 25, showing the parts with the float and cover removed;

Figure 27 is a vertical section taken on the line 27—27 of Figure 26;

Figure 28 is a vertical section taken on the line 28—28 of Figure 26;

Figure 29 is a plan view;

Figure 30 is an irregular horizontal section taken on the line 30—30 of Figure 27;

Figure 31 is a diagrammatic view of the electrical connections of the embodiment shown in Figures 25 to 30, inclusive;

Figure 32 is a modification of the embodiment shown in Figures 25 through 30;

Figure 33 is a further modification of the embodiment of Figures 25 through 30;

Figure 34 is a partial vertical section through another embodiment of my invention;

Figure 35 is an irregular horizontal section taken on the line 35—35 of Figure 34;

Figure 36 is an enlarged sectional view of the switch mechanism of Figure 35;

Figure 37 is a modification of the embodiment of Figures 34 through 36;

Figure 38 is an enlarged longitudinal section of the switch mechanism of Figure 37;

Figure 39 is a trasverse section of this switch mechanism and is taken on the line 39—39 of Figure 38;

Figure 40 is a longitudinal section through a preferred form of switch mechanism;

Figure 41 is a longtudinal section through the switch mechanism of Figure 40 but is taken at right-angles to the latter, as indicated by the line 41—41; and Figure 42 is a vertical section taken on the line 42—42 of Figure 41.

Referring to Figures 1 to 4, inclusive, I have shown my preferred form as having a base 50 provided with a bracket 52 adapted for attachment to any convenient part of an automobile. The base 50 has an inlet chamber 54 connected by pipe 56 with the main fuel tank of the automobile. This fuel tank is currently located at the rear of the automobile and below the engine carburetor which is normally located under the hood at the front of the machine.

Above the chamber 54 is an inlet valve 58 shown as a flat disk resting upon an annular seat 60 and pressed thereagainst by a spring 62 supported on a plate 64. Fuel from the inlet chamber 54 is drawn upwardly past the valve 58 and into the diaphragm chamber 66 located beneath a flexible diaphragm 68 of cloth or any other suitable material.

The margin of the cloth 68 is clamped between a cover 70 and the adjacent part of the base 50, screws 72 being provided for attaching the cover 70 to the base. A central portion of the diaphragm 68 is confined between a pair of opposed metal plates 74 and 76 having edges curving away from the diaphragm. It is to be noted that the lower plate 74 has a slightly greater diameter than the upper plate 76. The plates and diaphragm are urged downwardly by a spring 78 abutting against the cover 70, and the diaphragm is raised upwardly by a piston rod 80 extending through an opening in the cover and having its lower end riveted over the under side of the lower plate to clamp the plates and diaphragm firmly against suitable shoulders provided by the piston rod.

The fuel is discharged from the diaphragm chamber 66 past an outlet valve 82 shown as a flat disk seating on an annular seat 84 provided by the plate 64. The valve 82 is urged against its seat by a spring 86 resting on a spider 88. Beneath the discharge valve 82 is an outlet chamber 90 which is connected with the float bowl of the engine carburetor by way of pipe 92.

My improved pump overcomes the freezing difficulties of the prior art pumps. The inlet and outlet pipes of my fuel pump connect with the chambers located beneath the diaphragm chamber 66, whereas in the prior art pumps the diaphragm chamber is located beneath the inlet and outlet pipes. In my arrangement of these parts water, being heavier than gasoline, collects around the valves and chambers associated with the inlet and outlet pipes, from which places it is rapidly carried away by the flow therethrough resulting from pump operation, whereas in the commercial prior art the water accumulates and freezes on the diaphragm, from whence it is not discharged due to lack of flow across the diaphragm. Tests have shown that even where large quantities of water are purposely put in the gasoline in extremely cold weather, my improved fuel pump will discharge this water before it can freeze and interfere with the operation of the pump.

The upper portion of the piston rod 80 is offset laterally and extends through an opening 94 provided in the several plates which collectively form the pump armature 96. The extreme upper end of the piston rod 80 is bent at right angles, as shown at 98, and is threaded to receive an adjusting screw 100, a lock-nut 102 being provided to maintain the parts in adjusted position. The lower end of the screw 100 is reduced in diameter and is located in the socket formed in the upper side of a block 104 having a slot in its lower side for receiving a pin 106. The portion of the pin 106 located in this slot is cylindrical, and the surface of the block resting on this pin is similarly made cylindrical to provide a pivoted connection therebetween. The ends of the pin 106 project beyond the block 104 and rest in notches 108 provided in one of the plates of the pump armature 96.

I shall now describe the means for supporting and operating the pump armature 96. A bracket 110 is mounted on the base 50 by screws 112 which attach the spaced feet 114 of this bracket directly to the upper side of the base 50, as indicated most clearly in Figure 1. The bracket 110 is preferably stamped or otherwise suitably formed of heavy sheet metal and has a central portion 116 located beneath an electromagnet 118. Integral with the central portion 116 of the bracket is an upward extension 120 having its extreme upper end 122 bent laterally and extending above and in spaced relation to the electromagnet 118 which will hereinafter be called the pump magnet. The iron core 124 of the pump magnet is attached to the part 120 of the bracket by screws 126. These screws 126 also support a horseshoe-shaped field piece 128.

The free ends of the field piece 128 carry a cross bar 130, and the supporting spring 132, which forms a flexible pivotal support for the pump armature 96, is clamped between this cross bar 130 and a plate 134 which are secured together by bolts 136. It is to be noted that the upper surface of the plate 134 is curved, as indicated at 137, to control flexure of the spring 132 and thereby guide the pivotal movement of the pump armature 96. The curved surface 137 is so designed that no sharp bends or concentrations of stress occur in the spring 132.

As a further means to prevent the creation of sharp bends in the spring 132 and to prevent the localization and concentration of stress therein, I provide a plate 138 which is immediately above that end of the spring adjacent the pump armature 96. This plate may be perfectly rigid in so far as the accomplishment of the foregoing objects is concerned. However, I find that, if this plate is made very slightly flexible, the operation of the armature is quieter.

The pump armature 96 is composed of a series of plates formed of magnetic material which are secured together in any suitable means, as by rivets 140. The spring 132 and plate 138 are confined between adjacent armature plates and secured thereto by the rivets 140. It is to be noted that the pump armature is of such width that only a very small air gap is present between each end of the armature and the adjacent portion of the horseshoe shaped field piece 128, thus affording a highly efficient path for the magnet flux.

The face of the pump armature nearest to the adjacent end of the magnet core 124 is curved, as shown most clearly in Figure 4. The upper part of this curved surface has a smaller radius than the lower part whereby the air gap between the armature and core is extremely small for all positions of the armature. I have found that a curvature of the armature face, which gives a variation of between five and thirty-thousandths of an inch in this air gap, affords excellent results. The design of the parts is such that the magnetic force exerted on the armature creates tension on its supporting spring 132, thereby insuring long life of this spring. In the particular arrangement of the parts shown, the pump armature 96 would be pulled above horizontal position by the force exerted by the magnet 118. This arrangement of the parts I find to be particularly desirable as it gives a strong finish to the upward stroke of the pump armature which, in the usual adjustment of the parts, ceases when the armature reaches a horizontal position.

A feature of my invention lies in the resilient mounting for the electromotive parts. During each upward stroke of the armature, the part 120 of the iron bracket 110 which supports the magnet 118 and field piece 128, yields slightly to cushion the operation of the pump. This makes the operation of my improved pump quiet and substantially vibrationless and prolongs its life.

It is to be noted that the pump magnet 118 is practically surrounded by the horseshoe field piece 128 and the portions 116, 120 and 122 of the supporting bracket 110. The field piece and bracket are composed of magnetic material and serve to confine the magnetic field created by the magnet 118.

The pump magnet 118 is located in a circuit controlled by a main switch 142. This switch may be either of the type shown in Figures 5 to 10, inclusive, or of the improved type shown in Figures 40 to 42, inclusive. For convenience, I shall here describe the switch of Figures 5 to 10, inclusive, which comprises a bulb or capsule 144 of glass or other suitable material which is sealed in airtight relation to a pair of conductors 146 and 148 projecting from one end of the bulb. The conductor 148 is shown as connected to the turned-down end 150 of a sheet metal body 152 having its other end turned down as indicated at 154 to form a pair of legs 156 (Figure 10).

Adjacent the end 154 there is a central extension 158 carrying a spring 160 which supports a switch armature 162 of magnetic material. This armature carries a switch contact 164 of tungsten or any other suitable contact material. The spring 160 urges the contact 164 against a complementary stationary contact member 166 attached to a sheet metal part 168 connected to the conductor 146.

The sheet metal body 152 has a rectangular opening 170, on each side of which are insulating sheets 172 and 174 which are longer and wider than the opening 170, as indicated in Figure 6. These sheets in turn have aligned central openings which are smaller than the opening 170 and through which the lower U-shaped end of the part 168 projects to engage the contact 166 which it carries. The part 168 has ears 176 which overlie the insulating sheet 172, and the contact 166 extends beyond the edges of the opening in the lower insulating strip 174, whereby the two insulating strips are clamped between the ears 176 and the contact 166.

The body 152 has punched out fingers 178 to prevent longitudinal movement of the assembly comprising the insulating strips 172 and 174, the part 168 and the contact 166. The edges of the body 152 are turned down, as indicated at 179, to stiffen this body and to prevent lateral displacement of the aforesaid assembly.

The lower ends of the legs 156 and of the end 150 are curved on a radius slightly smaller than the radius of the glass tube 144 and the end 150. A spring 180 holds the curved portions of the legs 156 and end 150 firmly against one side of the glass tube. Since the bent over end 150 and legs 156 are made of definite length, this arrangement locates the contact 166 a definite distance from one side of the glass tube 144 and thereby limits the opening movement of the movable contact 164. The longitudinal position of the switch mechanism in the glass bulb 144 is definitely determined by the conductors 146 and 148 which are firmly imbedded in the glass where they pass therethrough.

It will be seen that the parts of the switch mechanism are in the main simple sheet metal parts which can be stamped to the desired shapes and which can be very cheaply made and assembled in operative position. Furthermore, because of the arrangement of the parts, no undue accuracy in manufacture or assembly is required. Attention is also called to the fact that the point at which the glass tube is sealed about the conductors 146 and 148 is remote from the springs 160 and 180 so that the heat utilized in creating this seal does not impair the resilience of these springs.

The interior of the bulb 144 may be either evacuated or filled with any suitable gas such as hydrogen, nitrogen, neon, etc. I have found hydrogen to be particularly desirable as it maintains the contact points clean and also serves as a good conductor of heat.

The contact members 166 and 164 of the main switch just described are normally maintained in closed position by spring 160. These contact plates are separated by exerting a magnetic pull on the switch armature 162 by means of a switch magnet indicated generally by reference character 182. This switch magnet is supported on a generally U-shaped frame 184 pressed out of heavy sheet metal and having a supporting leg 186 bolted or otherwise suitably secured to the base 50. The switch magnet 182 is secured to this frame by a screw 188 extending into the iron core 190 of the magnet.

The core 190 of the switch magnet has one end adjacent the main switch 142 and in such position that magnetic energization of this core acts upon the switch armature 162 and separates the switch contacts 164 and 166. The core 190 is acted upon by a pair of electrical coils 192 and 194 which are separated from each other by insulating rings 196 and which are wound in the same direction, as will be hereinafter more fully described.

The switch magnet 182 is located in a secondary circuit controlled by a pair of secondary switches indicated generally by reference letters A and B. The frame 184 carries a post 198 comprising washers formed of suitable insulating material. A switch member 200 is supported on the upper end of this post. The end of this switch member remote from the post is split into two fingers, as indicated most clearly in Figure 1, and each finger carries a contact member 202. The contact members 202 engage a single complementary contact member 204 supported on the top of the pump armature 96 and grounded by way of the pump armature and its supporting mechanism.

I find that the bifurcation of the end of the switch member 200 insures the establishment of a good electrical connection between this switch member and the pump armature under all conditions of operation and is preferable to a structure in which the end of the switch member 200 is not bifurcated and is provided with only a single contact piece. The bifurcated end of the contact member is preferably inclined, as indicated at 206, so that a wiping action takes place as the contact members 202 and 204 engage. This wiping action serves to maintain these contacts clean.

The secondary switch B comprises switch members 208 and 210 also mounted on the post 198 and insulated thereby. The switch member 208 is flexible and carries an insulating strip 212 which is engaged by the pump armature 96 to move the single contact 214 carried by this switch member into engagement with the two contacts 216 carried by the bifurcated end of the switch member 210. The contact carrying ends of the switch members 208 and 210 are inclined to give the wiping action previously described in connection with the switch A.

I provide a very simple adjustment whereby the secondary switches A and B may be simultaneously adjusted. This adjustment comprises a screw 218 threaded into the frame 184 and bearing at its lower end on an insulating strip 220 overlying the switch member 210. The screw 218 carries a nut 222 engaging the insulating strip 224 overlying switch member 200. By applying a wrench to nut 222 and a screwdriver to screw 218, both secondary switches will be simultaneously adjusted to give the desired operating characteristics. It will be noted that the screw 218 passes through an opening in the switch member 208 and has no contact therewith.

The electrical connections and mode of operation can best be described in connection with Figures 11 to 14, inclusive. In these figures, there is shown the usual automobile battery 230 indicated as grounded at 232, which in automotive practice means connected to the frame of the automobile. The battery 230 is in series with the usual ignition switch 234 and one side of the ignition switch is shown as connected to the conductor 146 of the main switch 142. The other main switch conductor 148 is connected by wire 236 with one end of the coil of the pump magnet 118, the other end of this coil being grounded at 238. One end of coil 194 of the switch magnet is connected through wire 240 with the ignition switch 234, and the other end of this coil is connected by wire 242 with the wire 236. A wire 244 connects one end of coil 192 with main switch conductor 148, and conductor 246 connects the other end of coil 192 with switch members 200 and 208. Switch member 210 is connected with the ignition switch by wire 248.

In Figure 11 the parts are shown in the "rest" position which they assume when the automobile is not operating. In this position the pump armature 96 is held down by the pump spring 78 and maintains the secondary switch B closed. No current is flowing through the switch magnet coils 192 and 194 and the main switch 142 is closed. Upon closing of the ignition switch 234 incidental to starting the automobile engine, current flows through main switch 142 and pump magnet 118 to pull the pump armature 96 upwardly.

Figure 12 shows this pump armature 96 during its upward stroke. As soon as it has moved upwardly a short distance, the secondary switch B opens. However, the opening of this switch does not break any current since no current was flowing through the circuit of which this switch is a part, due to the fact that this circuit was in shunt across the main switch 142 which acted as a short-circut therefor, in view of the negligible resistance of the main switch as compared with the high resistance of the coil 192.

During the upward stroke of the pump armature 96, the diaphragm 68 is raised, drawing fuel from the main fuel tank into the diaphragm chamber 66. As the diaphragm is raised, the pump spring 78 is compressed.

Figure 13 shows the parts in the position which they hold at the instant the pump armature 96 contacts with switch member A. At this instant a current is set up in the switch coil 192 which energizes the switch magnet to open the main switch 142. As this main switch opens, it breaks the circuit through the coil 192, but at the same instant breaks the short-circuit which has maintained the circuit of the coil 194 inoperative, whereupon the circuit through the coil 194 becomes effective to hold the main switch open during the full downward stroke of the pump armature 96, as indicated in Figure 14.

It will be noted that at the instant the contacts of the main switch 142 start to separate, both the circuit of switch coil 192 and the circuit of switch coil 194 are active but, since both of these coils energize the core of the switch magnet in the same direction, the two coils merely assist each other in opening the main switch during the instant at which the break occurs.

During the downward travel of the pump armature 96, the diaphragm 68 is forced downwardly by the pump spring 78, and the fuel in diaphragm chamber 66 is forced past the outlet check valve 82 and through pipe 92 to the carburetor fuel chamber.

When the pump armature 96 approaches the lower end of its movement, it closes the secondary switch B, thereby establishing a circuit through coil 192 which creates a magnetic effect on the core of the switch magnet in a direction opposite to that created by the coil 194. The coils 192 and 194 thus neutralize each other and the switch magnet becomes ineffective, whereupon the main switch 142 closes, and the cycle is repeated.

An important advantage of the electrical connections shown in Figures 11 to 14, inclusive, lies in the fact that no secondary circuit is broken while any current is flowing therethrough. This results in long life for the contact points in the switches A and B. Although it is not at all necessary, in view of the fact that the main switch contacts are sealed in an atmosphere of hydrogen, I sometimes find it desirable to place a high resistance 250 across the main switch conductors 146 and 148, as indicated most clearly in Figure 15. I have found that excellent results are obtained where the coil of the pump magnet 118 has a resistance of 2½ ohms, each of the coils 192 and 194 has a resistance of 30 ohms, and the resistance 250 has a value of 60 ohms; although it will be appreciated that other values may be selected.

The various elements of my novel fuel pump all co-operate to produce a new and unitary result. These elements are coordinated to provide a fuel pump which is quieter, produces less vibration, is more efficient, more economical and more durable than any fuel pump heretofore known.

The magnet and armature parts of the mechanism are so designed that they provide a substantially uniform pull on the diaphragm during its upward stroke. This provides a substantially uniform rate of upward movement of the central portion of the diaphragm, with the result that the inertia of the parts is prevented from becoming excessive and uncontrollable. This uniform rate of movement also provides a substantially uniform rate of inflow of fuel into the diaphragm chamber. This maintains the rate of fuel flow within limits which make it possible to avoid water hammer by means which I shall presently describe.

In order to secure the most efficient, quiet, and satisfactory operation of the fuel pump, it is essential to provide accurate timing of the motor mechanism and I have provided specially designed and co-ordinated switches and switching mechanism for accomplishing this result. The contacts of the main switch are enclosed in a bulb field with hydrogen or other inert gas and the switch contacts are separated by a magnet located outside of the bulb. This design of the main switch prevents burning and corroding of the switch contacts and insures uniform operation throughout the life of the mechanism. The secondary switches are of such nature that they can be accurately and easily adjusted to give the desired timing operation of the mechanism and these switches are located in novel circuits whereby opening of one of these secondary switches does not break a circuit, but simply diverts the flow of current through that circuit. In this manner I have prevented arcing and burning at the switch contacts, so that these secondary switches also maintain their accuracy of contact throughout the life of the mechanism. These features are important since even a slight fouling of a switch contact may interfere with the timing of the mechanism even though this fouling is insufficient to prevent the creation of a delayed electrical contact.

In a diaphragm pump of the type which I have disclosed, the maximum efficiency, quietness, economy, and smoothness of operation obtain when the timing of the parts is such that the upward pull of the armature on the diaphragm ceases just before the diaphragm is pulled to tautness. This eliminates the wear and tear to which the diaphragm is subjected when it is pulled taut by the armature and thereby greatly prolongs the life of the diaphragm. This also eliminates the vibration and water hammer which are present when the diaphragm is pulled taut by the armature. When the timing is such that the central portion of the diaphragm ceases its upward movement just before the diaphragm is taut, there is a slight slack in the diaphragm which hangs downwardly at the instant the central portion of the diaphragm ceases its upward movement. The inertia of the inflowing fuel swells this slack portion of the diaphragm upwardly and thereby fills the diaphragm chamber to maximum capacity. At the same time, the inflow of fuel is cut off gradually as the diaphragm is swelled upwardly to its maximum extent and this gradual cutting off of the inflow of fuel eliminates water hammer.

The accuracy of timing necessary to accomplish this result is made possible by the coordination and cooperation of the motor with its substantially uniform pull, producing ease of control, the accuracy of the timing switches and circuit arrangements, and the ability of the parts to maintain their original condition throughout the life of the fuel pump. A contributing factor to the maintenance of the proper adjustment of the switch circuits and motor is the elimination of pivotal bearings with their necessary variation in frictional resistance. Therefore, in my improved fuel pump the motor armature and movable switch contacts are supported by flexible springs. The resultant elimination of variable frictional resistances and the maintenance of the switch contacts in excellent condition, insure the continuance of the proper operation of the fuel pump throughout its life.

Figure 1:
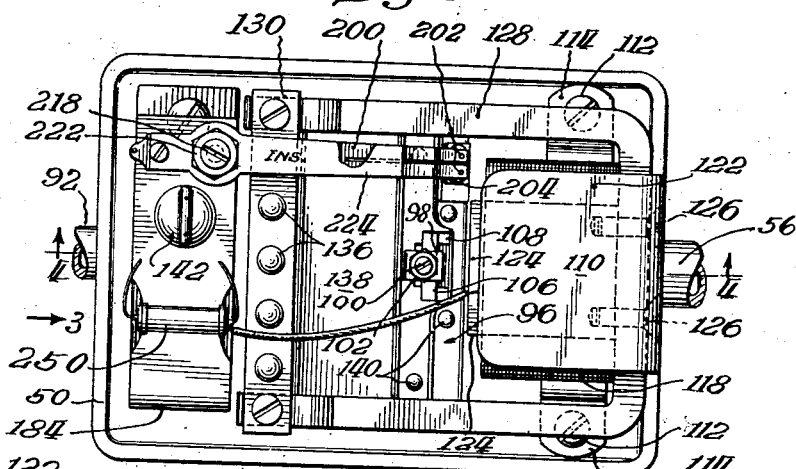
Figure 1 is a top plan view of a preferred form of my invention.
Figure 2:
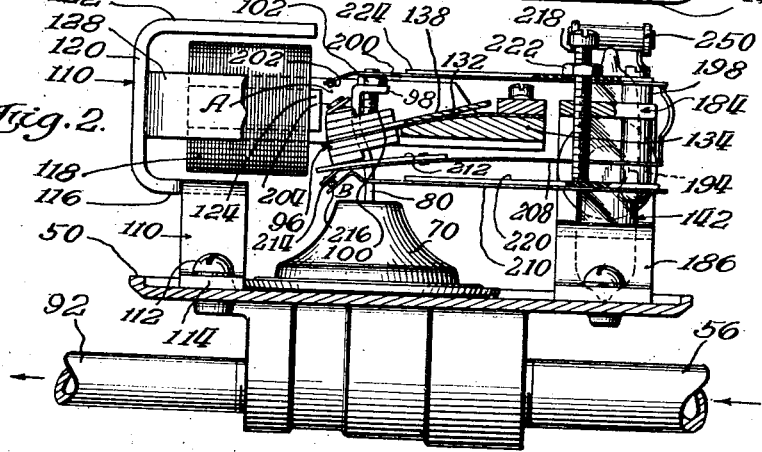
Figure 2 is a side elevation of the form shown in Figure 1, this view showing some of the parts in sectional elevation.
Figure 3:
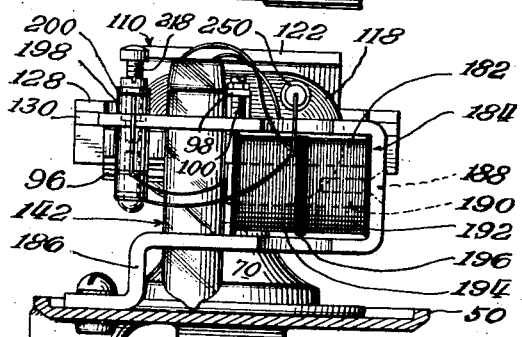
Figure 3 is an end elevation looking in the direction of the arrow 3 of Figure 1.
Figure 16:
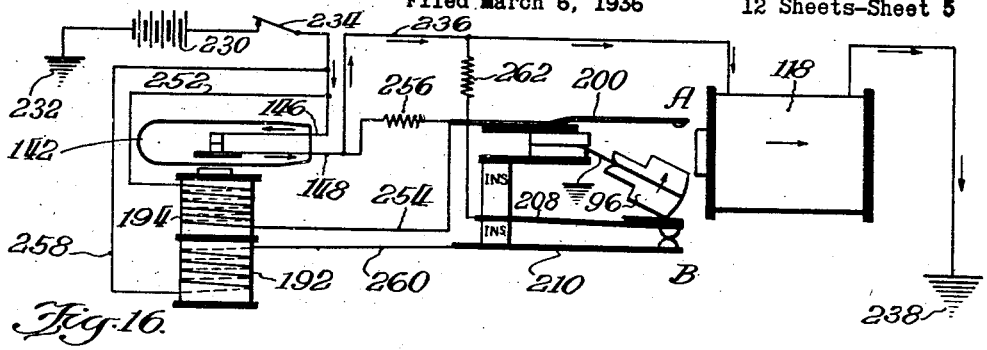

Figures 16, 17, 18 and 19 show several different positions of a modified form of the electrical connections described in the previous embodiment. In Figure 16 the switch magnet coil 194 is connected to the ignition switch by a wire 252, and the other end of this coil is connected by conduit 254 to switch member 200 and through resistance 256 to wire 236. One end of the coil 192 is connected by conductor 258 to the ignition switch, and the other end of this coil is connected by wire 260 to switch member 210. Complementary switch member 208 is connected to wire 236 through resistance 262.

In Figure 16 the parts are shown in the positions which they have when the ignition switch 234 is first closed. Closing of this switch causes a current through the main switch 142 and pump magnet 118 which energizes this magnet and starts the upward movement of the pump armature 96.

In this figure 16 there is shown a closed circuit through wire 258, switch magnet coil 192, wire 260, switch B, and resistance 262 which is shunted across the main switch. No current flows in this shunt circuit, however, since this shunt circuit offers high resistance, whereas the main switch offers no appreciable resistance.

Figure 17:
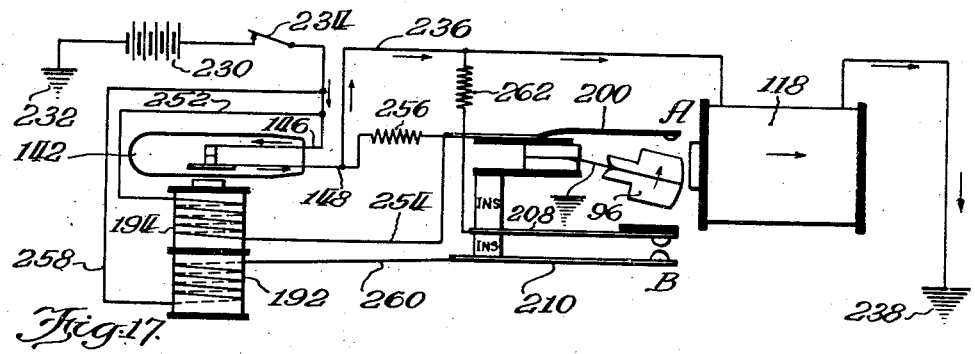

After the pump armature 96 has moved upwardly a short distance, the switch B opens, as indicated in Figure 17. Since no current was flowing in the shunt circuit of this switch, no sparking occurs at the switch contact points when the switch opens.

Figure 18:
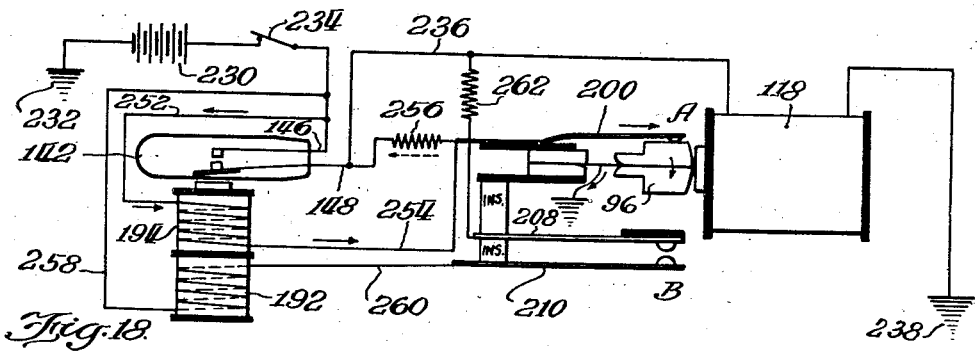
Figure 19:
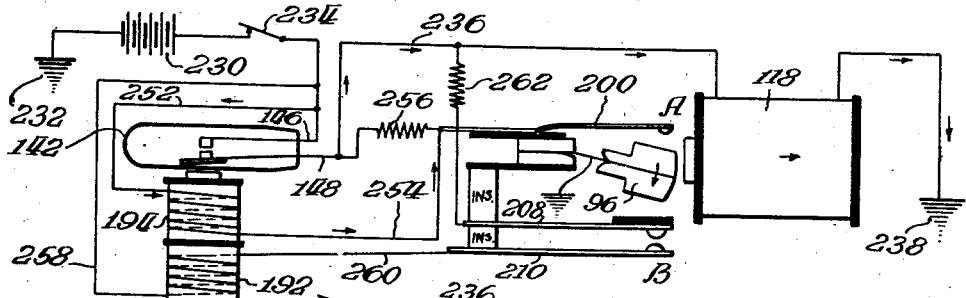

When the pump armature 96 reaches the upper limit of its stroke, it closes the switch A, as shown in Figure 18. This grounds the circuit through the magnet coil 194 which opens the main switch 142 and breaks the circuit through the pump magnet 118, deenergizing this magnet and permitting the pump armature 96 to be moved downwardly by the pump spring.

As the pump armature 96 starts its downward movement, the switch A is opened. When this occurs, the current flow through the magnet coil 194 continues in slightly diminished amount by way of resistance 256, wire 236, and pump magnet 118, to ground 238. The resulting flow through the pump magnet 118 is too small, however, to materially resist the downward movement of the pump armature 96 under the force of the pump spring.

When the pump armature reaches the lower limit of its movement, it closes switch B, thereby energizing switch magnet coil 192. Since coil 192 is wound oppositely to coil 194, the two coils neutralize each other and the main switch closes. The cycle of operations is then repeated.

A feature of this circuit is the fact that when the pump armature breaks the switch A, the flow of current through the coil 194 is not cut off but is simply shifted so that, instead of going through the switch A and pump armature to ground, it goes through resistance 256 and pump magnet 118 to ground. This arrangement eliminates sparking at the contact points of the switch A. I have found that good results are obtained when the resistances 256 and 262 are given a value of 2½ ohms each, but it is to be understood that other values may be used.

Figure 20 shows a slight variation of the wiring connections from that shown in Figures 16 to 19, inclusive. In this figure 20, the switch members 200 and 208 are interconnected by wire 264 and a single resistance 266 is used in lieu of the resistances 256 and 262 of Figures 16 to 19. The operation of the form shown in Figure 20 is identical with that described in connection with Figures 16 to 19.

Figures 21, 22, 23 and 24 show a further arrangement of electrical connections. In these figures, the switch magnet 270 has only a single coil, one end of which is connected through wire 272 with the ignition switch, the other end being connected by conductor 274 to switch member 200. I provide a second switch B' having a switch member 276 likewise connected to conductor 274, and a second switch members 278 connected to wire 236 through resistance 280. The switch member 276 has an extension provided with an insulating pad 282 adapted to be engage by the pump armature 96 to open the switch B'.

Figure 21:
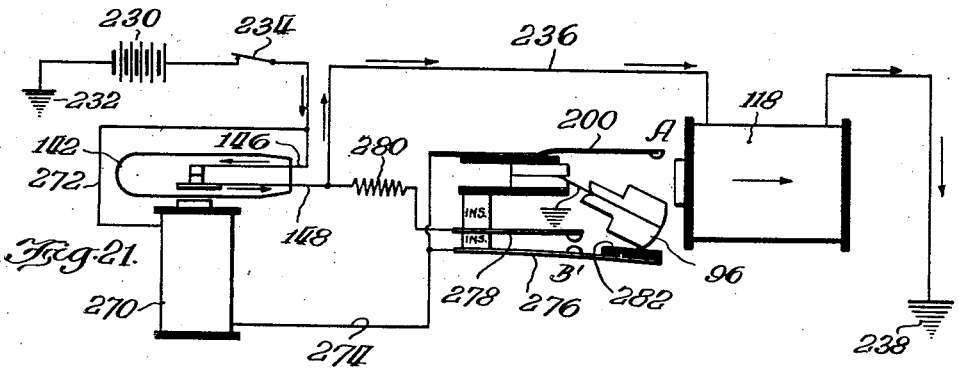
Figure 22:
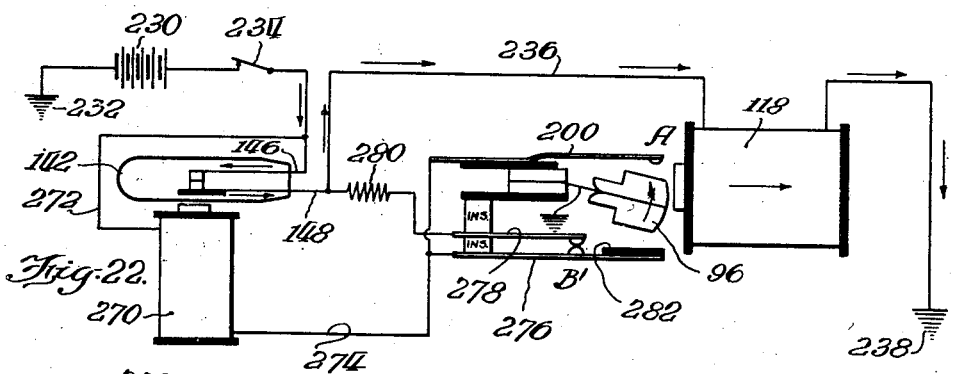

Figure 21 shows the parts in the position which they have when the ignition switch 234 is first closed. The main switch 142 is closed, and the current flows through this switch and through wire 236 to pump magnet 118, which is thereby energized, and raises pump armature 96.

As soon as the pump armature begins its upward movement, the switch B' closes by virtue of its own bias, thereby establishing a closed circuit through this switch. This circuit, however, offers comparatively high resistance to flow of current and is short-circuited by the main switch 142.

Figure 23:
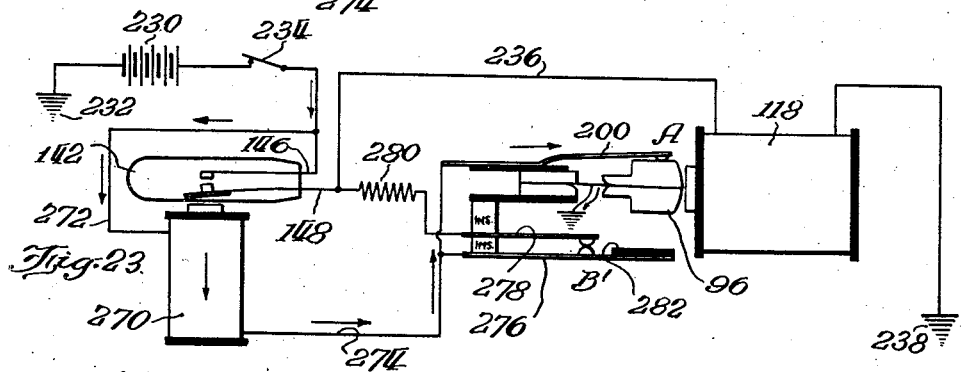
Figure 24:
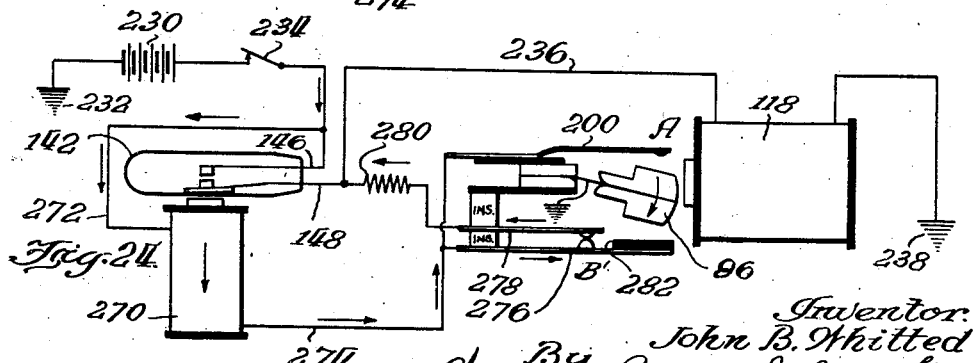

When the pump armature reaches the upper end of its stroke, it closes the switch A, as shown in Figure 23, thereby grounding the circuit through the switch magnet 270 and opening the main switch 142, thus breaking the circuit through the pump magnet 118. The fuel pump immediately starts its discharge stroke, drawing the pump armature 96 downwardly and breaking the circuit through the switch A. However, at this time the main switch 142 is open, and breaking the switch A simply establishes a circuit for the switch magnet 270 through switch B', and this switch magnet continues to hold the switch 142 open during the downward movement of the pump armature.

When the pump armature engages and opens the switch B', all circuits through the switch magnet 270 are broken or already open, whereupon this magnet becomes deenergized and the main switch 142 closes. The cycle of operation is then repeated.

It is to be noted that in all of the embodiments thus far described, the pump diaphragm is not moved upwardly until after it has made a full discharge stroke. This means that the speed of operation of the pump is directly proportional to the rate of fuel consumption by the automobile engine. This is important in that it reduces the current consumed by the fuel pump and also reduces wear on the parts by eliminating unnecessary movement of the mechanism.

In Figures 25 to 30, inclusive, I have illustrated a modified form of my invention which is shown as being located at 290 in the main fuel tank 292 of the automobile. This particular form of my invention is shown as being combined for convenience into an assembly which includes the tank part 294 of a gasoline gauge.

I have shown a plate 296 secured to the fuel tank 292 by screws 298. This plate carries a casing 300 containing parts of a gasoline gauge which is connected to the indicator on the instrument board by a wire 302 connected to the binding post 304. A float 306 is located in the fuel tank and is pivotally connected to the mechanism in the casing 300 by an arm 308.

My improved fuel pump 290 is supported on the lower end of a rigid pipe 310 which is attached to the plate 296 so that the fuel pump and parts of the gasoline gauge shown in Figure 25 form a unitary assembly with the plate 296. This is simply a convenient arrangement facilitating shipment by the accessory manufacturer and assembly on the part of the automobile manufacturer. It is to be understood that the particular structure of fuel pump shown in Figures 25 to 30 is not limited to mounting in the gasoline tank but may be located at other places on the vehicle and, conversely, that any of the other embodiments of fuel pumps disposed in this application may, if desired, be mounted in the fuel tank in the manner shown in Figure 25.

In Figure 25 the fuel pump mechanism is shown as being inclosed in a suitable casing. The parts are shown in section in Figure 27 and comprise a base 312 designed with a large inlet 314 protected by a strainer 316. Above the inlet 314 is the inlet valve 318 leading to the diaphragm chamber 320. This diaphragm chamber is connected by way of an outlet valve 322 with the lower end of the pipe 310 which leads to the engine carburetor. The diaphragm 68 and its cooperating parts may be identical with those shown in Figure 4.

The diaphragm is raised by a piston rod 324 having a hook-shaped upper end partially surrounding a pin 326 carried by the pump armature 328 which is essentially the same as the pump armature described in the first embodiment.

The pump armature 328 is attached to and supported by a spring 330 clamped between cross bar 332 and plate 334. In this form of my invention the plate 138 of Figure 4 is dispensed with. The armature 328 is raised by the pump magnet 118 and is moved downwardly by the pump spring 78, as in the first embodiment. The current flow through the magnet 118 is controlled by a main switch 336 which may be either of the type shown in Figures 5 to 10, inclusive, or of the type shown in Figures 40 to 42, inclusive.

In the form of my invention shown in Figures 25 to 30, I use a magnet which is continuously energized throughout the operation of my fuel pump, and open and close the switch 336 by moving this magnet into and out of switch influencing position. This magnet may be either a permanent magnet or an electromagnet which operates continuously during the operation of the fuel pump. I prefer the latter and show an electromagnet having a coil 338 which receives its current from the automobile battery. This coil is wound on an iron core 340 having tapered ends 342 forming bearing supports for a pivoted field piece noted generally by reference character 344. The coil 338 and core 340 are carried by a supporting bracket 346 riveted or otherwise secured to the pump cover 70.

The field piece 344 comprises a pair of arms 348 and 350 secured to each other at one end by a spring-like strap 352 which causes tapered sockets formed in the arms to engage the tapered ends of the magnet core with just sufficient pressure to create a good flux-conducting connection but without offering any appreciable resistance to pivotal movement of the field piece 344. The arm 350 has a rearward extension terminating in a transverse part 354 adapted to engage stops 356 and 358 of felt or other suitable material to limit pivotal movement of the field piece. A weight 360 is attached to this portion 354 to balance the field piece about its pivotal support.

One of the armature plates has an arm 362 pivoted at 364 to link 366 having a hook-shaped end 368 carried by spring 370. This spring hangs from a magnetic shield 371 bolted to the U-shaped frame 373. This frame carries magnet 118 and armature 328 and is resiliently mounted on plates 375 attached to supports 374. Plates 375 have resilient sections 377.

The link 366 has an intermediate high point 372 held by spring 370 against the under side of the lateral flange 379 of a bracket 376 attached to arm 348 adjacent the pivot therefor. The link 366 constitutes part of the means for shifting the field piece 344 between its two extreme positions. In Figure 27 the pump armature 328 is shown in its lower position whereby the link 366 is in its backward or leftward position, as viewed in this figure, so that the high point 372 engages the under side of the bracket 376 to the left of the pivot for the field piece 344, thereby holding the field piece against the stop 356.

In this position of the field piece the main switch 336 is closed and the magnet 118 is energized to raise the armature 328. As the armature rises, the link 366 moves to the right, as viewed in Figure 27, and as the armature reaches the top of its stroke, the high point 372 moves to the right of the pivotal support for the field piece, whereupon this field piece is swung to magnet influencing position, as shown in dotted lines in Figure 28. In this position of the field piece, the main switch 336 is held in the open position and the pump spring 78 moves the diaphragm and armature downwardly. As the armature approaches the lower limit of its stroke, the link 366 moves backwardly or to the left, as viewed in Figure 27, to the position shown therein, and the field piece 344 is moved away from the main switch 336 which thereupon closes and reenergizes the pump magnet 118 to repeat the cycle.

The electrical connections for this form of my invention are shown in Figure 31 wherein the automobile battery 230 is grounded at 232 and connected through ignition switch 234, main switch 142, and wire 236, with the pump magnet 118, as in the previous embodiments. The high resistance 250 is shown as shunted across the terminals of the main switch 142 as in the form of Figure 15.

The coil 238 of the electromagnet is indicated as grounded at 378 and connected to the ignition switch 334 by wire 380. It is to be noted that the electromagnet is energized continuously during the operation of the fuel pump, and that opening the ignition switch of the automobile automatically opens the circuits of the pump magnet and switch magnet. I have found that good results are obtained where the coil 238 is given a resistance of 30 ohms, the pump magnet has a resistance of 2½ ohms, and resistance 220 has a value of 60 ohms, as in the previous embodiments.

Figure 32 shows a variation of the embodiment shown in Figures 25 through 30, inclusive. In this Figure 32 the pivoted field piece 400 is in the form of a permanent magnet which is pivotally mounted on the upper end of a bracket 402 attached to the base 404 carrying the same pump mechanism as that described in the previous embodiment. Pivotal movement of the field piece 400 is limited by stops 406 and 408 which may be of felt or other suitable material which will reduce noise and jar.

The field piece 400 is moved to switch opening position by pump magnet 118 which is resiliently mounted as in the last previous embodiment. The lower side of the magnet 118 is unshielded and this magnet creates a field which attracts the right-hand end of field piece 400.

The field piece 400 is balanced about its pivotal support and is pulled downwardly by a coil spring 410. This field piece controls the main switch 336 in the manner previously described in connection with the last embodiment. The field piece 400 functions as a pendulum which times the strokes of the pump armature 328, giving a constant rhythmic rate of movement to this armature and the pump diaphragm.

This form of my invention varies from the preceding forms in that the pendulum action of the field piece 400 gives a uniform rate of operation to the fuel pump, and in this form of my invention the stroke of the pump varies in accordance with the fuel requirements of the engine, whereas in the previous embodiments the stroke was constant but the rate varied.

The parts are shown as inclosed in a cover 412 which protects the parts against dirt, water and injury, and which may also be so designed as to prevent the fuel pump from undesirably affecting an automobile radio.

In Figure 33 the form shown utilizes the same electromagnet 338 and field piece 344 shown in Figure 27. In this form of my invention the right-hand end of the field piece 344 is raised by the magnetic force of the pump magnet 118 to swing the field piece to switch-influencing position. The field piece is returned to inactive position by a leaf-spring 420 which is carried by the armature 328 and which engages one arm of the field piece 344 to the right of its pivotal support, as viewed in Figure 33. The extremes of movement of the field piece are limited by stops 422 and 424.

Figure 34 shows a different form of my invention in which a base 450 is provided and has suitable means whereby it may be attached to any convenient part of an automobile. This base is connected with an inlet pipe 452 and an outlet pipe 454, suitable inlet and outlet valves 456 and 458 being provided to connect these pipes with a diaphragm chamber 460. The diaphragm 462 may be of the type previously described and is attached to the base 450 by a cover 464. A pair of links 466 and 468 connect the diaphragm with one end of a spring 470, having its other end attached to a bracket 472 carried by the pump armature 474. The spring 470 constitutes a means for pivotally connecting the armature 474 with the pump diaphragm.

This pump armature is pivotally mounted on a spring 476 attached to a suitable support 478 mounted on the base 450. The bracket 472 also carries a stop 480 which engages part 482 of the support to limit the upward movement of the diaphragm and pump armature under the influence of the pump spring 484.

The pump magnet 486 is shown as attached to an inclosing casing 488 secured to the base 450 by means not shown.

The pump magnet 486 is controlled by a main switch 490 carried in a housing 492 which is pivotally supported on a pair of brackets 494 secured to the base 450. A permanent magnet 496 is secured to the pump cover 498 by screws and plates 500 and 502 and opens the main switch 490 when the switch is shifted to one limit of its pivotal movement.

The pump armature 474 carries a pair of strips 504 which have clamped between them a spring 506 passing through an opening in a lug 508 on the switch housing 492. The strips 504 jointly form a Y-shaped reinforcement for the spring 506.

As the pump armature 474 pivots about its support 478, the spring 506 urges the switch housing 492 to one extreme of its movement and, as the armature movement continues, the spring is reinforced and stiffened by one or the other of the strips 504 until the force of the spring is sufficient to shift the switch housing 492 from one to the other of extreme positions. These extreme positions are defined by the wings 510 and 512 of the housing which engage with opposite sides of the adjacent end of the magnet 496.

The main switch and its housing are shown most clearly in Figure 36. This switch comprises a glass bulb 514 having a wire 516 connected to a contact plate 518. The wire 516 is indicated as being grounded through the pivotal support for the switch housing. A second contact plate 520 is connected to a wire 522 extending through the wall of the bulb and passing through an opening 524 in spaced relation to the housing 492. The wire 522 may be provided with a flexible portion 525 to provide for the pivotal movement of the switch and its housing.

When the switch is in one extreme of its pivotal movement, the magnet 496 acts upon a movable contact 526 in the form of a roller having disks 528 of tungsten or other suitable material to form an electrical connection between the contact plates 518 and 520. It is to be understood that the contact plates 518 and 520 extend through only a small arc so that, when the switch is oscillated to the other extreme, the roller 526 remains adjacent the end of the magnet 496 but the contact plates 518 and 520 have moved away from and are no longer engaged by this roller. Axial movement of the roller 526 is limited by the wire 516 and by a pin 530.

Figure 38 shows a simplified form of switch in which the glass bulb 532 has a pair of wires 534 and 536, each connected to a contact plate 538 and 540, respectively. A roller 542 establishes communication between the plates 538 and 540 when the bulb 532 is so positioned that the pole of the magnet 544 draws this roller against these plates. The arcuate extent of the plates 538 and 540 is best shown in Figure 39.

The bulbs of the switches shown in Figures 36 and 38 may be filled with hydrogen or other gas or may be evacuated.

Figure 37 shows a structure utilizing the switch of Figure 38. In this form of my invention the switch 532 is mounted for rotation from shaft 550 through a pair of gears 552 and 554. The shaft may be driven from the cam shaft of the engine of an automobile or from any moving part of any vehicle or other structure. When the rotation of the switch 532 brings the contact plates 538 and 540 adjacent the end of the magnet 544, the roller 542 establishes a circuit through the switch. This circuit is shown as leading through wire 555 to a pump magnet 118 grounded at 556. The other terminal of the switch is connected through its support 558 with the automobile battery and ignition switch.

In Figures 40 to 42, inclusive, I have shown a preferred form of switch which is an improvement over that shown in Figures 5 to 10, inclusive. In the switch of Figures 40 to 42, I provide a glass tube 560 containing a sheet metal frame 562 having down-turned legs 564 and 566 provided with rounded lower ends curved on a radius less than the radius of the tube 560, as most clearly shown in Figure 42. A spring 568 attached to the upper side of the frame 562 maintains the legs 564 and 566 pressed against one side of the tube 560.

A conductor 570 extends through one end of the tube and is attached to the leg 564. This conductor is in electrical communication with a contact 572 mounted on a spring 574 riveted or otherwise suitably attached to a raised portion of the frame, as indicated at 576. The contact 572 lies in an opening in the frame 562 and is urged downwardly by the spring 574. The unattached end of the spring 574 is prolonged, as indicated at 578, and contacts with the adjacent portion of the frame 562 when the contacts are separated to form a limit stop for the downward movement of the contact 572 under the influence of spring 574.

A second contact 580 is secured to an armature 582 carried by a spring 584 which urges the contact 580 upwardly and into engagement with the contact 572.

A second conductor 586 extends through one end of the tube 560 and is attached to a terminal 588. The terminal 588 is insulated from the frame 562 by an insulating sheet 590 which is confined between shoulder 592, upturned frame edges, 594, 596, and upturned finger 598.

A second insulating sheet 600 is located between the under side of the frame 562 and the spring 584. The terminal 580, insulating pieces 590 and 600, and spring 584, are attached to the frame 562 by a hollow rivet 602 which passes through an enlarged opening in the frame 562 so that there is no contact between this rivet and the frame. This rivet establishes an electrical connection between the terminal 588 and spring 584 so that the conductor 586 is in electrical communication with the contact 580.

Figure 41 shows the position of the parts when the contacts 572 and 580 are engaged. It is to be noted that in this position of the parts the spring 574 of the upper contact (as viewed in Figure 41) has been flexed upwardly so that the free end 578 of this spring is spaced from the upper surface of the frame 562. When a magnetic influence is exerted on the armature 582 to draw this armature and its associated contact 580 downwardly, the upper contact 572 also moves downwardly until the end 578 of its spring engages the upper surface of the frame 562, whereupon the downward movement of the contact 572 is suddenly arrested. By the time this occurs the lower contact 580 and its relatively heavy armature 582 have acquired momentum and this momentum, plus the pull of the magnet, are sufficient to separate the contacts, even though they have a tendency to stick together. This is an important feature of this improved switch.

I have also provided means to insure the creation of a good electrical connection between the contacts 572 and 580 immediately upon their initial engagement by eliminating any mechanical bouncing of either or both contacts when they are first brought together. In carrying out this objective, I mount the upper contact 572 upon a spring 574 so that, as the contacts first engage, the upper contact 572 yields in the direction of movement of the contact 580.

In this connection, it is to be noted that the mass of the upper contact 572 is much less than the mass of the lower contact 580 and its associated armature 582. I find that the combination of the yielding mounting of what would normally be a fixed contact, together with the superior mass of the movable contact, completely eliminates bouncing of the contacts when they first engage.

I also find that the particular mounting of the contacts present in this embodiment of my invention maintains the engaging surfaces clean. This is due to the fact that as the surfaces engage, one slides across the other and these surfaces are thus wiped clean.

The point at which the tube 560 is sealed about the conductors 570 and 586 is remote from the springs 584, 574 and 568 so that the heat utilized in effecting this seal does not destroy the temper of these springs. The seal formed between the conductors 570 and 586 and the tube 560 determines the longitudinal position of the frame 562 in the tube 560. As a means of strengthening the frame 562, its edges may be turned downwardly, as indicated at 604 and 606.

In the foregoing description, the terms "upper and lower" and "upwardly and downwardly" have been used in describing the structure with reference to Figure 41. The mechanism shown therein need not be used in the position shown in this figure but can be located in any desirable position.

The tube 560 may be evacuated or filled with any suitable gas but I prefer to fill it with hydrogen for the reasons previously described herein.

In my divisional application, Serial No. 233,903, filed October 8, 1938, I am claiming certain switch mechanism disclosed herein and more particularly the switch illustrated in Figures 40 to 42 of the instant application.

My novel pump is of such efficient design that it requires only a small current for its operation. This eliminates undue drain on the automobile battery and also makes it possible to place my pump in the gasoline tank of an automobile without protecting it by means of a gas or liquid-tight casing since the currents flowing through the exposed switches in the switch magnet circuits are so small that operation of these switches will not produce a spark capable of igniting a combustible mixture of gasoline vapor and air.

My invention is not limited to the details shown and described but may assume numerous forms, and the scope of my invention is to be limited solely by the following claims.

I claim:

1. In an electric fuel pump of the class described, the combination of a diaphragm chamber, a diaphragm therefor, inlet and outlet valves for said chamber, a spring for moving said diaphragm on its discharge stroke, a pull rod for said diaphragm, a pump armature pivotally connected to said pull rod, an electromagnet for attracting said armature to move said diaphragm in opposition to said spring, said magnet having a core, said armature having a face adjacent said core and curved on different radii to give a minimum air gap and maximum pull at the end of the power stroke of said armature, and switch means controlling said magnet.

2. In an electric fuel pump of the class described, the combination of a diaphragm chamber, a diaphragm therefor, inlet and outlet valves for said chamber, a spring for moving said diaphragm on its discharge stroke, a pull rod for said diaphragm, a pump armature connected to said pull rod and mounted for angular movement, an electromagnet for attracting said armature, said armature having a face adjacent said magnet and curved on different radii to give maximum efficiency of operation, a main switch controlling said magnet, said switch comprising a glass bulb filled with hydrogen, a pair of conductors extending through said bulb, relatively movable contact elements in said bulb for opening and closing the circuit through said magnet, and means including a switch magnet for separating said contact elements.

3. In apparatus of the class described, the combination of an armature having a curved contact face formed on different radii, an electromagnet for attracting said armature, a switch controlling said electromagnet, said switch comprising a hydrogen filled bulb, a pair of conductors extending through said bulb, relatively movable contact elements in said bulb for opening and closing a circuit through said magnet, means including a second magnet for separating said contact elements, and a spring constituting a pivotal support for said armature.

4. In a device of the class described, the combination of an armature, an electromagnet for attracting said armature, a frame carrying said magnet, a spring pivotally connecting said armature and frame, a resilient mounting for said frame, a switch controlling said magnet, and mechanism operated by said armature.

5. In a device of the class described, the combination of an armature, an electromagnet for attracting said armature, a frame carrying said armature and magnet, a spring pivotally supporting said armature on said frame, a resilient mounting for said frame, a switch controlling said magnet, and means for opening said switch.

6. In a device of the class described, the combination of a laminated armature, an electromagnet for moving said armature, a frame supporting said armature and magnet, a spring pivotally attaching said armature to said frame, a switch controlling said magnet, said switch comprising a sealed bulb, a pair of conductors extending through said bulb, relatively movable contacts in said bulb, and switch controlled means including a second magnet.

7. In an electric fuel pump of the class described, the combination of a diaphragm chamber, a diaphragm therefor, inlet and outlet valves for said chamber below said diaphragm, a spring for moving said diaphragm on its discharge stroke, a pull rod for said diaphragm, a pump armature, a pin carried thereby, a block pivoted on said pin, an adjustable connection between said block and rod, an electromagnet for attracting said armature, an iron bracket supporting said pump magnet and having parts parallel therewith, said magnet having a core terminating adjacent said armature, and means controlling said magnet.

8. In an electric fuel pump of the class described, the combination of a diaphragm chamber, a diaphragm therefor, a pull rod for said diaphragm, a pump armature pivotally connected to said rod, an electromagnet for attracting said armature, an iron bracket supporting said pump magnet and having parts parallel therewith, said magnet having a core terminating adjacent said armature, a horseshoe field piece supported at its closed ends and having arms extending in close proximity to said armature, a spring forming a pivotal support for said armature, and a curved plate attached to the ends of said field piece and supporting and guiding said spring.

9. In a device of the class described, the combination of an armature, a magnet for attracting said armature, a frame, a spring pivotally connecting said armature to said frame, and a guide plate overlying a part of said spring adjacent said armature to prevent sharp bends in said spring.

10. In a device of the class described, the combination of a variable chamber, an armature for varying said chamber, an electromagnet influencing said armature, and a switch controlling said magnet, said switch comprising a sealed bulb having conduits extending therethrough, a sheet metal body having turned-over ends, a spring urging said ends against said bulb, a contact member rigidly supported by said body, and a movable contact member for engagement therewith, movement of said movable contact member being limited by the length of said ends.

11. In a fuel pump of the class described, the combination of a chamber, a diaphragm therefor, a spring for urging said diaphragm in one direction, an armature for moving said diaphragm in the opposite direction, a magnet attracting said armature, a main switch controlling said magnet, and a second switch controlling said main switch, said second switch being operated by said armature and comprising a pair of members having inclined contact ends to provide a wiping contact, one of said ends being bifurcated.

12. In a fuel pump of the class described, the combination of a variable chamber, a spring for reducing the size of said chamber, an armature for enlarging said chamber, an electromagnet for attracting said armature, a main switch controlling said magnet, a second magnet controlling said switch, a pair of secondary switches controlling said second magnet, and a single adjustment for both of said secondary switches.

13. In a device of the class described, the combination of an armature, a magnet for attracting said armature, a main switch controlling said magnet, connections including a pair of secondary switches controlling said main switch, and adjusting means for varying the stroke of said armature by shifting the positions of said secondary switches.

14. In a device of the class described, the combination of an electromagnet, a diaphragm-type fuel pump operatively connected to said magnet, a main switch controlling said magnet, a second magnet controlling said switch, said second magnet having a coil shunted across said main switch and a second coil in parallel with said first-mentioned coil, and switch means for operating one of said coils.

15. In mechanism of the class described, the combination of an electric circuit having a switch therein, a magnet controlling said switch, said magnet having a pair of coils, a second switch for energizing one of said coils in a given direction, and a third switch for energizing said last-mentioned coil in the opposite direction.

16. In a device of the class described, the combination of an electromagnet, a diaphragm-type fuel pump driven thereby, a main switch controlling said magnet, a second magnet controlling said switch, said second magnet having a pair of coils wound in parallel, and switch means for reversing the direction of flow of current through one of said coils.

17. In a fuel pump of the class described, the combination of a variable pumping chamber, a spring for decreasing the volume of said chamber, a magnet for increasing said volume, a switch controlling said magnet, a second magnet controlling said switch, said second magnet including a pair of oppositely wound coils, and switch means controlling the energization of said coils.

18. In a device of the class described, the combination of an electromagnet, an armature attracted thereby, a main switch controlling said magnet, a second magnet for controlling said switch, said second magnet having a pair of oppositely wound coils axially spaced and separated by insulation, a circuit including a separate resistance for each coil, and switch means operated by said armature for controlling said coils.

19. In a device of the class described, the combination of an armature, a magnet for attracting said armature, a switch controlling said magnet, a second magnet controlling said switch, said second magnet having a pair of coils, a common resistance for both said coils, and switch means operated by said armature for controlling said coils.

20. In a fuel pump of the class described, the combination of a diaphragm chamber, a diaphragm therefor, a spring for moving said diaphragm in one direction, an armature for moving said diaphragm in the opposite direction, an electromagnet for attracting said armature, a switch controlling said magnet, a second magnet controlling said switch, said second magnet having a single coil, a second switch for opening and closing a circuit through said coil, a resistance, and a third switch for cutting said resistance in and out of said coil circuit without breaking said circuit.

21. In mechanism of the class described, the combination of a diaphragm chamber, a diaphragm therefor, a spring for moving said diaphragm in one direction, an armature for moving said diaphragm in the opposite direction, an electromagnet for attracting said armature, a circuit controlling said magnet, a main switch in said circuit, a high resistance across said switch, and secondary circuits controlling said switch, said secondary circuits including switches above and below said armature and operated thereby.

22. In a fuel pump of the class described, the combination of a diaphragm chamber, a diaphragm therefor, a pull rod for said diaphragm, an armature having an opening and carrying a pin extending thereacross, said rod having a hook pivotally engaging said pin, a magnet for attracting said armature, a switch controlling said magnet, a pivotally mounted field piece for opening said switch, and means for moving said field piece about its pivot to control said switch.

23. In a device of the class described, the combination of a movable armature, a magnet for attracting said armature, a switch controlling said magnet, said switch having an armature, and means for attracting said armature to open said switch, said means including a pivoted field piece, a stationary coil for magnetizing said field piece, said coil having a core providing conical bearings, said field piece being pivotally supported on said bearings.

24. In a device of the class described, the combination of an electromagnet having a stationary core, a coil wound thereon, a pivoted field piece having tapered ends, a pivoted field piece having sockets receiving said tapered ends, said field piece comprising a pair of arms, and a resilient strap connecting said arms and holding them in light engagement with said pivoted ends.

25. In a device of the class described, the combination of a switch having an armature, magnetic means for attracting said armature to open said switch, said means including a stationary core, a coil wound thereon and connected to a source of electric current, a field piece pivoted on said core, said field piece having a part extending in the general direction of said armature and a second part extending away from said armature, a balancing weight mounted on said second part, means for moving said field piece about its pivot to attract said armature and open said switch, and stops for limiting the pivotal movement of said field piece.

26. In a fuel pump of the class described, the combination of a variable pumping chamber, a spring for decreasing said chamber, an armature for enlarging said chamber, a magnet for attracting said armature, a frame carrying said armature and magnet, and a resilient support for said frame comprising a plate provided with a groove to increase its resilience.

27. In a device of the class described, the combination of an armature, a magnet for attracting said armature, a switch controlling said magnet, a pivoted field piece controlling said switch, and a link having one end pivotally attached to said armature and a second end supported on a spring, said link having a part engaging said field piece on opposite sides of said pivot, depending upon the position of said armature, to oscillate said field piece about its pivot in predetermined relationship to the movements of said armature.

28. A fuel pump for use on automotive vehicles having a battery and an ignition switch, comprising in combination a diaphragm chamber, a diaphragm therefor, a spring for moving said diaphragm in one direction, an armature for moving said diaphragm in the opposite direction, a magnet for attracting said armature, a main switch controlling said magnet, said main switch and magnet connected to said ignition switch, an electromagnet for controlling said main switch, means connecting said last-named magnet to said ignition switch in parallel with said main switch and said first-named magnet whereby said second magnet is continuously energized while said ignition switch is closed, and means for varying the effect of said second magnet on said main switch.

29. In a fuel pump of the class described, the combination of a variable chamber, an armature for enlarging said chamber, a magnet for attracting said armature, a switch controlling said magnet, said switch having a movable contact member, an armature attached thereto, a permanent magnet for attracting said armature to open said switch, and means for moving said permanent magnet into and out of switch armature attracting position.

30. In a device of the class described, the combination of an electromagnet, a switch controlling said magnet, a pivoted field piece controlling said switch, said field piece being moved to one position by the attraction of said magnet, and a spring for moving said field piece to a second position.

31. In a fuel pump of the class described, the combination of a variable chamber, an armature for varying said chamber, a magnet for attracting said armature, a switch controlling said magnet, a second magnet controlling said switch, said second magnet having a stationary coil and a pivoted field piece movable into and out of operative relationship with respect to said switch, said field piece being attracted by said first-mentioned magnet to move it into operative relation with said switch, and a leaf spring carried by said armature and engaging said field piece for moving the latter into inoperative position.

32. In a fuel pump of the class described, the combination of a diaphragm chamber, a diaphragm therefor, a spring for moving said diaphragm in one direction, an armature for moving said diaphragm in the opposite direction, a spring forming a pivotal connection between said armature and said diaphragm, and a magnet for attracting said armature.

33. In a fuel pump of the class described, the combination of a diaphragm chamber, a diaphragm therefor, an armature beneath said chamber, a connection between said armature and diaphragm, a spring for moving said diaphragm in one direction, and a stop carried by said armature and remote from said diaphragm for limiting movement of said diaphragm under the influence of said spring.

34. In a fuel pump of the class described, the combination of a variable pumping chamber, an armature for varying said chamber, a magnet for attracting said armature, an oscillable switch controlling said magnet, and a connection between said armature and said switch for oscillating the latter.

35. In a device of the class described, the combination of an armature, an electromagnet for attracting said armature, an oscillable switch controlling said magnet, a housing pivotally supporting said switch, said switch including a movable contact controlled by a second armature, a permanent magnet for attracting said second armature, a spring carried by said first-mentioned armature and engaging said housing to pivot the latter, reinforcing members variably engageable with said spring, and stops carried by said housing for alternately engaging said permanent magnet.

36. In a device of the class described, the combination of an electromagnet, a movable armature therefor, a switch comprising a pair of contacts for controlling said magnet, an oscillable frame carrying both of said contacts, and a resilient drive between said frame and armature.

37. In a device of the class described, the combination of a variable chamber, fuel connections therefor, a spring for decreasing said chamber, an armature for enlarging said chamber, a magnet for attracting said armature, a switch for controlling said magnet, said switch comprising a bulb having a pair of contacts therein and a roller for opening and closing a circuit through said contacts, a magnet controlling said roller, and a drive for rotating said bulb.

38. In a device of the class described, the combination of a variable pumping chamber, a spring for reducing the size of said chamber, an armature for enlarging said chamber, an electromagnet for attracting said armature, a main switch controlling said magnet, a second magnet controlling said switch, and a pair of secondary switches controlling said second magnet.

39. In a fuel pump of the class described, the combination of an armature, a magnet for attracting said armature, a main switch controlling said magnet, connections including a pair of secondary switches controlling said main switch, and control means for said secondary switches.

40. In a device of the class described, the combination of a magnet core, a U-shaped field piece, a spring fulcrum, a curved support for said spring, and an armature located between and in the plane of the arms of the U-shaped field piece and connected to said spring fulcrum.

41. In a device of the class described, the combination of a diaphragm chamber, a diaphragm therefor, a pull rod for said diaphragm, an armature pivotally connected to said rod, an electromagnet for attracting said armature, a bracket supporting said magnet and having parts parallel therewith, said magnet having a core terminating adjacent said armature, a horse shoe field piece supported at its closed ends and having arms extending in close proximity to said armature, a spring forming a pivotal support for said armature, and a curved plate attached to the ends of said field piece and supporting and guiding said spring.

42. In a fuel pump adapted for use on an automobile having a battery and an ignition switch, the combination of a variable pump chamber, an armature for varying the volume of said chamber, an electro-magnet influencing said armature, a switch controlling said magnet, a second magnet timing said last-named switch, and conductors connecting both of said magnets to said battery through said ignition switch.

JOHN B. WHITTED.